US006940918B1

(12) United States Patent
Nayler et al.

(10) Patent No.: US 6,940,918 B1
(45) Date of Patent: Sep. 6, 2005

(54) COMPATIBILITY MODE PULSE SIGNAL GENERATION CIRCUIT AND METHOD

(75) Inventors: Colin Nayler, Sunnyvale, CA (US); Atul Garg, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 972 days.

(21) Appl. No.: 09/769,202

(22) Filed: Jan. 24, 2001

(51) Int. Cl.[7] ............................................... H04L 5/12
(52) U.S. Cl. ...................... 375/295; 370/509; 375/377
(58) Field of Search ................................ 375/295, 261, 375/260, 259, 368, 365, 362, 354, 377, 298, 375/239; 370/509, 503, 480, 464

(56) References Cited

U.S. PATENT DOCUMENTS

| | | | |
|---|---|---|---|
| 6,208,663 B1 * | 3/2001 | Schramm et al. ........... 370/465 |
| 6,212,240 B1 * | 4/2001 | Scheibel et al. ............ 375/261 |
| 6,522,352 B1 * | 2/2003 | Strandwitz et al. ....... 348/211.2 |
| 6,603,808 B1 * | 8/2003 | Anne et al. ................. 375/222 |
| 6,668,032 B1 * | 12/2003 | Nayler ....................... 375/355 |
| 6,741,659 B1 * | 5/2004 | Chan et al. ................. 375/295 |

\* cited by examiner

Primary Examiner—Tesfalder Bocure
Assistant Examiner—Pankaj Kumar
(74) Attorney, Agent, or Firm—Renner, Otto, Boisselle & Sklar, LLP

(57) ABSTRACT

A network transmitter for generating frames of data for transmission in a compatibility mode network including frames utilizing two modulation schemes is provided. The transmitter includes a first physical layer circuit generating frames utilizing a first modulation scheme and a second physical layer circuit generating frames utilizing a second modulation scheme. The second modulation circuit retrieves a compatibility mode header from the first physical layer circuit for generating compatibility mode frames.

13 Claims, 4 Drawing Sheets

COMPATIBILITY MODE PULSE SIGNAL GENERATION CIRCUIT AND METHOD

TECHNICAL FIELD

The present invention relates generally to network interfacing, and more particularly, to a compatibility mode frame generation circuit in a transmitter operating in a frame switched multiple access network including compatibility mode frames comprising two different modulation schemes.

BACKGROUND OF THE INVENTION

Networks serve the purpose of coupling data between many remotely spaced computing devices, such as computers, file servers, printers etc., so that valuable computing resources can be shared amongst the various devices.

A commonly known technique for transmitting data across a network is to break the data file into smaller frames, each of which is individually modulated onto a carrier and transmitted on a network medium to a remote destination. At the destination, the carrier is demodulated to recover the data and the frames are sequenced to recover the data file.

Each frame includes a portion of the data file along with overhead data for routing the frame to the destination device. When such technique is used in a network, the network is commonly known as a frame-switched network or packet-switched because each frame, or packet, can be routed to a different destination across a multiple access topology.

In the absence of any distortion of the carrier signal across the network medium, the received carrier would be identical in phase, amplitude, and frequency to the transmitted carrier and could be demodulated without error using known mixing techniques, the digital data could be recovered using known sampling algorithms, and the data file can be readily recovered by simply re-sequencing the frames.

However, the network topology tends to distort the carrier signal. In a multiple access cable network, the distortions are typically due to reflections of the transmitted carrier caused by numerous branch connections and different lengths of such branches. Such problems are even more apparent in a network which uses home telephone wiring cables as the network cable medium because the numerous branches and connections are typically designed for transmission of plain old telephone system POTS signals in the 0.3–3.4 kilohertz frequency range and are not designed for transmission of high speed data signals.

Such distortion of frequency, amplitude, and phase of the carrier signal degrades network performance and tends to impede the design of higher data rate networks and challenges designers to continually improve modulation techniques and data recovery techniques to improve data rates. For example, under the Home Phoneline Networking Association (HPNA) 1.0 standard, a 1 Mbit data rate is achieved using pulse position modulation (PPM) of a carrier, while the more recent HPNA 2.0 standard achieves a 10 Mbit data rate using a complex modulation scheme utilizing a frequency diverse quadrature amplitude modulation (QAM).

A problem associated with advancing standards and increasing data rates is that, as in the HPNA example, the modulation techniques are not the same. As such, backwards compatibility is not inherent in the design of the newer systems. For example, in the HPNA system, to be backwards compatible, the newer HPNA 2.0 device must be able to transmit and receive both the PPM modulated carrier compliant with the HPNA 1.0 standard and the frequency diverse QAM modulated carrier compliant with the HPNA 2.0 standard. Further, the newer HPNA 2.0 devices must be able to operate in a compatibility mode network which includes both HPNA 1.0 devices and HPNA 2.0 devices. In a compatibility mode network, HPNA 2.0 devices may not communicate directly with other HPNA 2.0 devices utilizing the QAM modulation scheme because the older HPNA 1.0 devices, without the ability to receive QAM frames, will detect the QAM frames only as noise on the network. As such, the HPNA 2.0 standard provides for use of compatibility mode frames which include a PPM modulated header and a QAM modulated body which includes gaps between QAM modulated data to emulate PPM timing gaps. The PPM modulated header is detectable by both the HPNA 1.0 device and the HPNA 2.0 devices on the compatibility mode network and operates to alert the HPNA 1.0 devices that the frame is not addressed to such device.

A problem associated with compatibility mode frames is that each of the PPM modulation scheme and the QAM modulation scheme typically require distinct physical layer circuitry for generating the modulated carrier. While both physical layer circuits typically exist in an HPNA 2.0 device because it must be able to transmit and receive both HPNA 1.0 frames and HPNA 2.0 frames, structuring the two circuits to operate together, with nearly perfect timing, to generate a single frame including both a PPM modulated header and a QAM modulated body is both difficult and expensive at best.

Therefore, based on recognized industry goals for size, cost, and power reductions, what is needed is a device and method for compatibility frame generation which does not suffer the disadvantages of known systems.

SUMMARY OF THE INVENTION

A first aspect of the present invention is to provide a network transmitter for generating data frames of data for transmission on a network medium. The network transmitter includes a frame generation circuit which comprises a first physical layer circuit and a second physical layer circuit. The first physical layer circuit generates data frames including overhead bits and data bits and modulates such frames of data for transmission on a network medium using a first modulation scheme which may be pulse position modulation. The second physical layer circuit generates data frames including overhead bits and data bits received from the media access layer circuit and modulates such frames of data for transmission on a network medium using a second modulation scheme which may be quadrature amplitude modulation. The first physical layer circuit and the second physical layer circuit are operatively coupled for generating a compatibility mode frame comprising the initial header overhead bits modulated using the first modulation scheme and the remainder of the frame modulated using the second modulation scheme. The initial header overhead bits may be 16 bits of access ID.

In the pulse position modulation scheme two bits of data may be encoded in each pulse by generating each pulse at a position corresponding to one of four possible pulse positions following a predetermined time gap.

The second physical layer circuit may obtain pulse position data from the first physical layer circuit for the initial header overhead bits and generate pulses of a quadrature amplitude modulated carrier at times corresponding to the pulse position data to generate the initial header overhead bits.

Following the initial header overhead bits, the remainder of the frame, which utilizes the quadrature amplitude modulation, may comprise a sequence of gaps interspacing quadrature amplitude modulated data, the sequence of gaps being at the predetermined pulse position modulation time gaps.

The network transmitter may also include a scrambler for converting at least a portion of the remainder of the frame modulated using the quadrature amplitude modulation scheme to a scrambled format prior to modulation, the scrambled format providing for adequate bit transitions to limit electromagnetic noise outside a predefined transmission band. A predetermined bit sequence, occurring after a 48-bit preamble, may initialize the scrambler.

The network transmitter may further include a media access controller receiving a data file for transmission from an upper layer application and making data available to the second physical layer circuit on a data bus.

A second aspect of the present invention is to provide a method of transmitting data frames in a frame switched network including a first device capable of transmitting and receiving data frames utilizing pulse position modulation and a plurality of second devices capable of transmitting and receiving data frames utilizing quadrature amplitude modulation. The method comprises transmitting initial header overhead bits, which may be 16-bits of access ID, complying with the pulse position modulation scheme by transmitting pulses of a quadrature amplitude modulated carrier, utilizing a quadrature amplitude modulation physical layer circuit, in time durations complying with valid pulse positions and transmitting the remainder of the frame utilizing the quadrature amplitude modulation scheme.

The pulse position modulation scheme may encode two bits of data in each pulse by generating each pulse at a position corresponding to one of four possible pulse positions following a predetermined time gap and the positions of the pulses may be determined by a pulse position modulation physical layer circuit operatively coupled to the quadrature amplitude modulation physical layer circuit.

The remainder of the frame utilizing the quadrature amplitude modulation may comprise a sequence of gaps interspacing quadrature amplitude modulated data, the sequence of gaps being at the predetermined pulse position modulation time gaps.

The method may further include a step of receiving the frame from a media access controller which in turn receives a data file for transmission from an upper layer application.

The method may also include scrambling at least a portion of the remainder of the frame modulated using quadrature amplitude modulation scheme to a scrambled format prior to modulation, the scrambled format providing for adequate bit transitions to limit electromagnetic noise outside a predefined transmission band. A predetermined bit sequence, occurring after a 48-bit preamble, from the media access layer may initialize scrambling.

DESCRIPTION OF THE PREFERRED EMBODIMENTS

Figure 1:
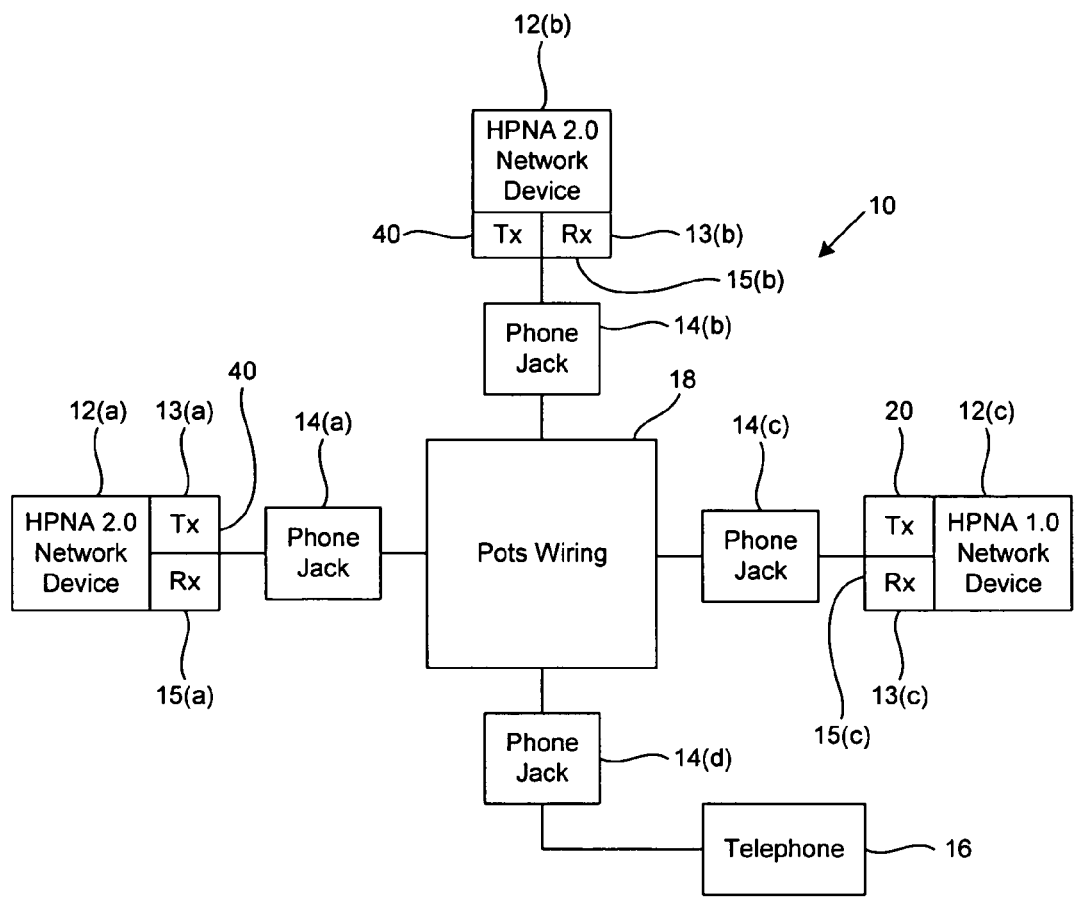
FIG. 1 is block diagram representing a local area network in accordance with an embodiment of this invention.

The present invention will now be described in detail with reference to the drawings. In the drawings, like reference numerals are used to refer to like elements throughout.

Referring to FIG. 1, a network 10 includes a network backbone 18 which interconnects a plurality of data ports 14(a)–14(d). In the preferred embodiment, the network backbone 18 comprises the plain old telephone service (POTS) wiring existing in a household environment and the data ports 14(a)–14(d) comprise the RJ-11 phone jacks positioned at the termination of each branch of the POTS wiring. As such, a POTS telephone 16 can be coupled to one of the data ports 14(d) for normal telephone operation in the 0.3–3.4 KHz frequency band simultaneous with network data traffic in a frequency band centered at 7.5 MHz.

A plurality of network devices 12(a)–12(c) are each coupled to one of the data ports 14(a)–14(b) respectively and such network devices 12(a)–12(c) communicate data to other network devices 12(a)–12(c) across the network 10 utilizing the HPNA 1.0 and the HPNA 2.0 compatibility mode predefined data communication protocols, both of which are promulgated by the Home Telephone Networking Association (HPNA) which includes a consortium of companies including Advanced Micro Devices of Sunnyvale Calif.

More specifically, network device 12(c), being an HPNA 1.0 device communicates with devices 12(a) and 12(b) utilizing the HPNA 1.0 protocol. Network devices 12(a) and 12(b), being HPNA 2.0 devices, each communicate with device 12(c) utilizing the HPNA 1.0 protocol, but communicate with each other utilizing the HPNA 2.0 compatibility mode protocol.

Each of the network devices 12(a)–12(c) may comprise a typical desk top computer and/or server, printer, or other consumer network device or appliance and is coupled to the network 10 utilizing a network interface circuit 13(a)–13(c). In a network device 12 such as a computer or server, the network interface circuit 13 may be embodied in a network interface card plugged into one of the computer's expansion slots or PCMCIA ports. However, in other consumer appliances or devices, the network interface circuit may be embedded with other circuits for operating such appliance or device.

Each network interface circuit 13(a)–13(c) will typically include a network transmitter circuit, which in the case of network interface circuit 13(c) is HPNA 1.0 transmitter circuit 20 and in the case of network interface circuits 13(a) and 13(c) is HPNA 2.0 transmitter circuit 40, for broadcasting frames on the network backbone 18 and a network receiver circuit 15(a)–15(c) for detecting and receiving frames from the network backbone 18. However, as discussed in U.S. patent application Ser. No. 09/517,351, filed Mar. 2, 2000, entitled Network Appliance with Simplified Network Transmitter, which includes common inventorship and is commonly assigned with the present application, it is envisioned the network interface circuit in certain consumer appliances or devices may include a network transmitter circuit only.

Figure 2A:
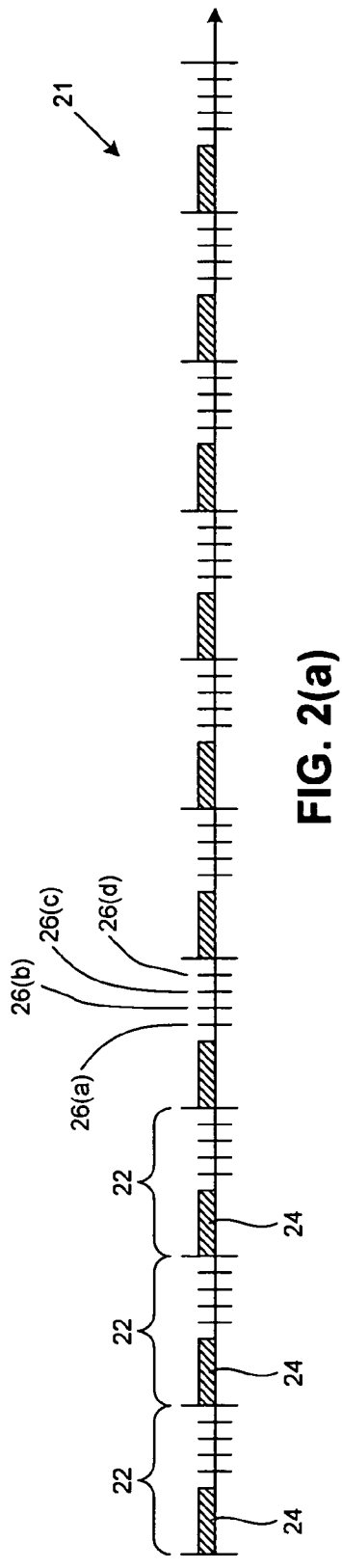
FIG. 2(a) is a timing diagram representing pulse position modulation in accordance with an embodiment of this invention.

Referring to FIG. 2(a) a timing diagram representing HPNA 1.0 pulse position modulation is shown. The HPNA 1.0 frame 21 comprises a sequence of 128-tic timing windows 22. Each tic is 7/60,000,000 second in duration such that each timing window is 896/60,000,000 second in duration. The HPNA 1.0 pulse position modulation protocol provides for the first portion of each timing window to be a blanking interval 24 which is 60 tics in duration. Following the 60-tic blanking interval, there exist four time positions 26(a)–26(d) in the remaining 68 tics of the timing window 22 at which a pulse may be placed. The pulse comprises a 7.5 MHz carrier sinusoid enclose within an exponential envelop and is generated by producing four 7.5 MHz square wave cycles and passing the square wave cycles through a band pass filter. Each such position at which a pulse may be placed represents one of the four possible combinations of two bits of binary data such that each pulse represents two bits of binary data.

At the beginning of each frame 21, the first 8 timing windows 22 comprise the access ID (AID). The AID includes 8 bits of access ID and 4 bits of control word. The Access ID is dynamically assigned to each device on the network and is used by a recipient to identify whether it should receive the frame and is used for collision detection purposes. The control word carries speed and power information.

Following the AID, the remainder of the frame which includes additional overhead information as well as data is also transmitted. Such remainder is transmitted by blocking the arriving bit stream into 3–6 bit blocks and then utilizing each block to encode a data signal.

Figure 2B:
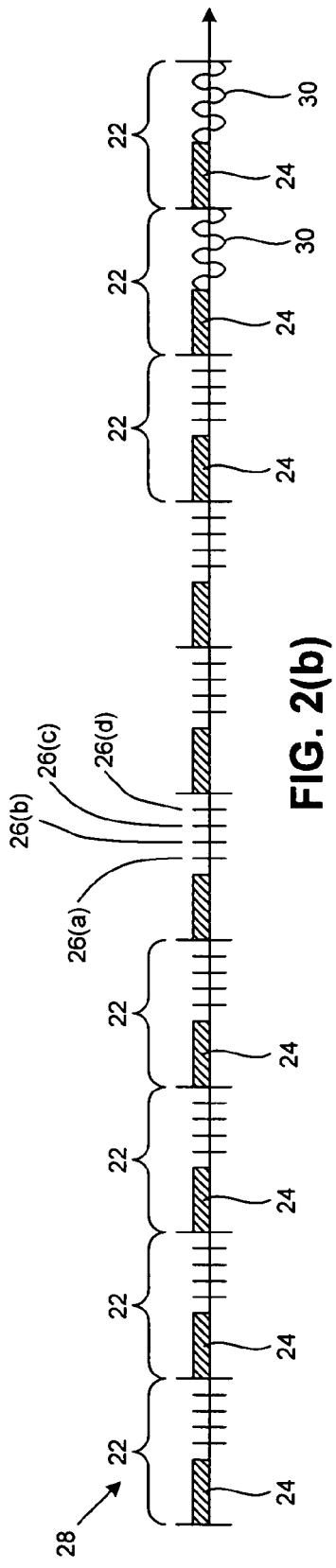
FIG. 2(b) is a timing diagram representing a compatibility mode frame in accordance with an embodiment of this invention.

Referring to FIG. 2(b) a timing diagram representing an HPNA 2.0 compatibility mode frame 28 is shown. Similar to the HPNA 1.0 pulse position modulation frame 21 (FIG. 2(a)), the compatibility mode frame 28 also comprises a sequence of 128-tic timing windows 22. Again, each tic is 7/60,000,000 second in duration such that each timing window is 896/60,000,000 second in duration and the first portion of each timing window is a blanking interval 24 which is 60 tics in duration.

Following the blanking interval 24, data may either be modulated by placing a pulse at one of the four time positions 26(a)–26(d) in the remaining 68 tics of the timing window 22 utilizing exactly the same scheme as the HPNA 1.0 pulse position modulation scheme or be QAM modulated onto a sinusoidal carrier 30. More specifically, the first 8 timing windows 22 of the compatibility mode frame 28 are pulse position modulated and include the HPNA 1.0 compliant AID and the remaining timing windows are QAM modulated overhead bits and data bits.

The purpose of utilizing both modulation techniques is such that information which must be receivable by all network devices, including both HPNA 1.0 devices and HPNA 2.0 devices may be modulated utilizing the HPNA 1.0 pulse position modulation technique while the portions of the frame 28 which only need to be received by another HPNA 2.0 device may be QAM modulated. The purpose of formatting the QAM modulated data into timing windows 22 with an initial blanking interval 24 is to assure that HPNA 1.0 devices recognize that a frame is being transmitted to avoid collisions.

Figure 3:
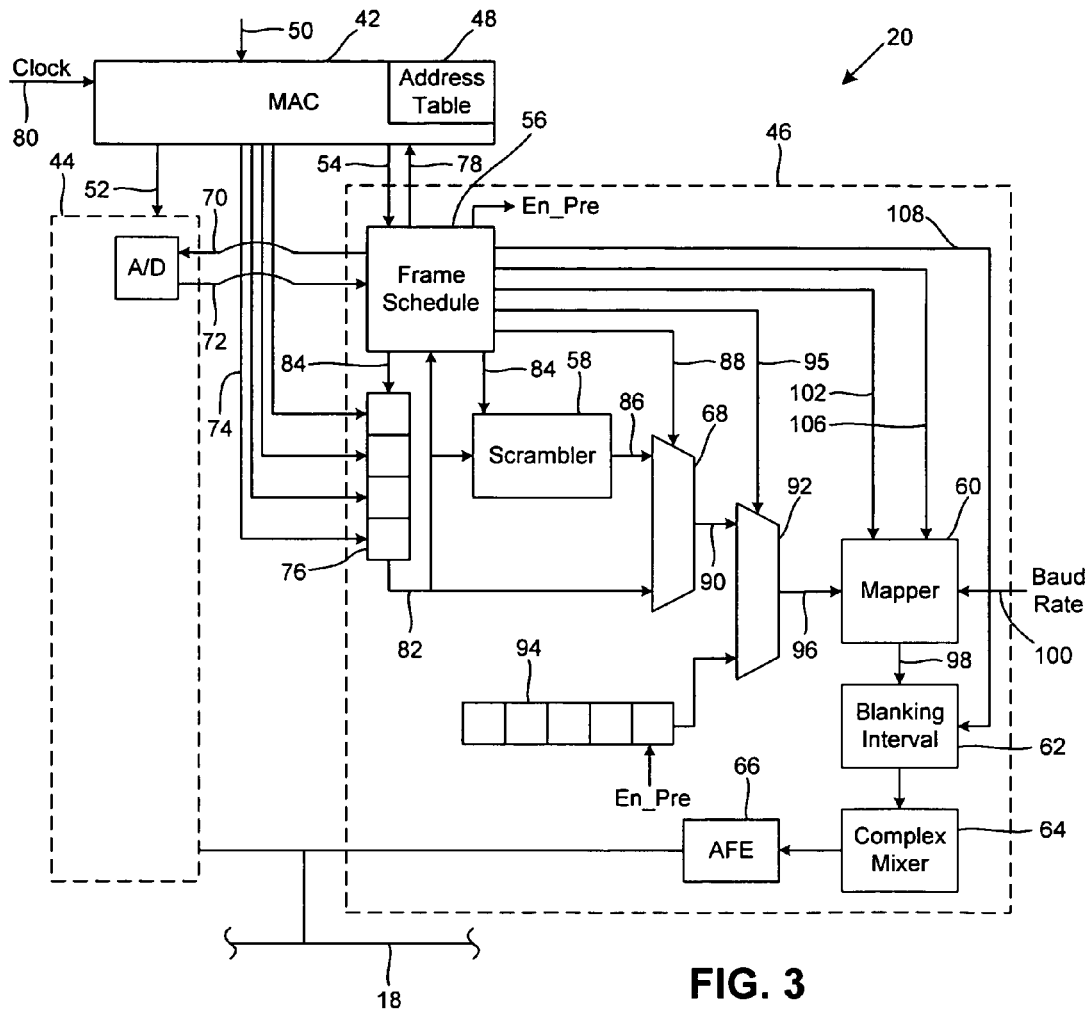
FIG. 3 is a circuit diagram of a transmitter circuit in accordance with an embodiment of this invention.

Referring to FIG. 3, a block diagram of the HPNA 2.0 network transmitter circuit 40 is shown. The network transmitter circuit includes a media access controller 42, an HPNA 1.0 physical layer circuit 44, and an HPNA 2.0 physical layer circuit 46.

The media access controller 42 receives data files for transmission on internal bus 50 from an upper layer application being executed by the network device processor (not shown). The media access controller 42 includes an addressing table 48 which includes information related to whether each other devices on the network 10 (FIG. 1) are HPNA 1.0 devices or HPNA 2.0 devices. When the media access controller 42 has data from the upper layer application prepared for transmission, it asserts a transmit enable signal on either: 1) line 52 to the HPNA 1.0 physical layer circuit 44 if the recipient device is an HPNA 1.0 device requiring transmission of an HPNA 1.0 frame or 2) line 54 to the HPNA 2.0 physical layer circuit 46 if the recipient device is an HPNA 2.0 device requiring transmission of a compatibility mode frame.

The data is transferred from the media access controller 42 to the HPNA 2.0 physical layer circuit 46 on a 4-bit transmit data bus 74. In the exemplary embodiment, the rate at which data is placed on the transmit data bus 74 is controlled by a transmit rate signal on line 78 from a frame schedule circuit 56 to the media access controller 42. The media access controller 42 is driven by a 32 MHz clock signal 80 and the transmit rate signal on line 78 provides an indication of how many clock cycles should be skipped between each 4-bit nibble placed on the transmit data bus 74. For example, a 32M-bit data rate can be achieved by placing a 4-bit nibble on the transmit data bus 74 every fourth clock cycle while a 16M-bit data rate can be achieved by placing a 4-bit nibble on the transmit data bus 74 every eighth clock cycle.

The transmit data bus 74 is coupled to a serializer 76 which may be a 4-bit shift register. The serializer 76 converts the 4 bits of parallel data on the transmit data bus 74 to serial data on line 82. A serializer enable signal on line 84 controls the serializer 76 such that data is clocked-out of the serializer 76 at the data rate of line 82 and is in phase with 4-bits of data being clocked-into the serializer 76 on the transmit data bus 74.

Line 82 is input to both a first input of a multiplexer 68 and to a scrambler 58. The scrambler 58 operates in a known manner to scramble the data on line 82 to assure that the frequency of bit transitions does not deviate from a defined band to assure that the signal ultimately transmitted on the network backbone 18 does not include excessive side band noise. The scrambler 58 is driven by a scrambler enable signal on line 84 which clocks the scrambler at the same rate as data on line 82. The output of the scrambler 58 is input to the second input of the multiplexer 68 on line 86.

Because scrambled data can only be recovered in a receiver if a de-scrambler in the receiver operates in the same phase as the scrambler 58 in the transmitter circuit 20, the beginning portion of each frame is transmitted unscrambled and a particular bit sequence (included in the overhead) is used to enable the scrambler 58 and the de-scrambler in the receiver to assure that both operate in the same phase. Typically, the bit sequence for enabling the scrambler 58 is after the training sequence and the training sequence itself has the correct frequency of bit transitions to assure that there is not excessive side band noise in the modulated carrier.

The multiplexer 68 selects between unscrambled data on line 82 and between scrambled data on line 86 in accordance with a bypass signal from the schedule circuit 56 on line 88. The bypass signal provides for the multiplexer 68 to select unscrambled bits on line 82 (and output unscrambled bits on line 90) during the first portion of the frame prior to the scrambler enable bit sequence and selects scrambled bits on line 86 (and outputs scrambled bits on line 90) during a scrambled portion of the frame occurring after the scrambler enable bit sequence.

Line 90 is coupled to the first input of a second multiplexer 92. Coupled to the second input of the second multiplexer 92 is the output of a register 94. The register 94 stores data representative of the predefined training bit sequence. In the exemplary embodiment, the training bit sequence is a 128-bit sequence which comprises four cycles of a 32-bit sequence for an HPNA 2.0 frame and is a 96-bit sequence which comprises three cycles of the same 32-bit sequence for an HPNA 2.0 compatibility mode frame. As such, the register 94 stores the 32-bit sequence. The second multiplexer 92 is driven by a select signal from the frame schedule circuit 56 on line 95. The select signal provides for data to be selected from the register 94 on the second input during the training sequence of each frame and for data to be selected from line 90 on the first input during the other portions of the frame. Additionally, in the exemplary embodiment, an end of frame sequence is identical to one cycle of the 32-bit sequence comprising the training sequence such that the select signal on line 95 also selects data from the register 94 on the second input during the end of frame sequence.

The output of the second multiplexer on line 96 is input to the mapper 60. In the exemplary embodiement, the mapper 60 utilizes an encoding constellation for each payload (e.g. 2, 4, 6, and 8 bits/baud) to define a sequence of I-channel values and Q-channel values at base band frequency on line 98 which represent the sequential data input to the mapper on line 96.

The mapper operates under control of a baud rate signal on line 100 and an enable mapper signal on line 102, both of which are provided by the frame schedule circuit 56. The enable mapper signal is a 3-bit signal which indicates a payload encoding and provide for the mapper to utilize appropriate number of bits from the input on line 96 for each baud cycle in accordance with the following table.

| | |
|---|---|
| 001 | 2-bits/baud |
| 010 | 3-bits/baud |
| 011 | 4-bits/baud |
| 100 | 5-bits/baud |
| 101 | 6-bits/baud |
| 110 | 7-bits/baud |
| 111 | 8-bits/baud |

In operation, the schedule circuit 56 monitors incoming data on line 82 and utilizes such data to latch appropriate data fields in its internal registers for controlling the scrambler enable signal on line 84, the mapper enable signal on line 102, the baud rate signal on line 100, and each of the multiplexer control signals on lines 88 and 94.

The frame schedule circuit 56 is also coupled to and AID pulse generator 104 within the HPNA 1.0 physical layer circuit 44 by an AID request line 70 and an AID pulse line 72. When transmitting a compatibility mode frame, the frame schedule circuit 56 requests AID pulse positions for the particular frame from the AID pulse generator 104 on line 70 and receives data representing the position of each of the 8 pulses for each of the 8 initial timing windows respectively on AID pulse line 72. The frame schedule circuit utilizes such pulse positions from line 72 to generate a pulse position signal to the mapper 60 on line 106. The pulse position signal is digital data clocked at the same data rate as date on line 96, but is data formatted by the frame schedule circuit such that when mapped to predefined constellation coordinate by the mapper 60, the output on line 98 is a base band signal that when mixed to carrier frequency will emulate a PPM modulate pulse at the appropriate pulse position.

The base band I-channel values and Q-channel values as output by the mapper 60 on bus 98 are input to a blanking interval inserter circuit 62. The blanking interval inserter circuit 62 operates under control of the frame schedule circuit 52 via a blanking control signal on line 108 and inserts blank data for generating the blanking intervals in each timing window 22 (FIG. 2(b)). The output of the blanking interval inserter circuit 62 is input to a complex mixer 64 which modulates the output onto a carrier frequency signal. The output of the complex mixer 64 is input to an analog front end 66 which includes appropriate amplifiers for broadcasting the modulated carrier onto the network medium 18.

Figure 4:
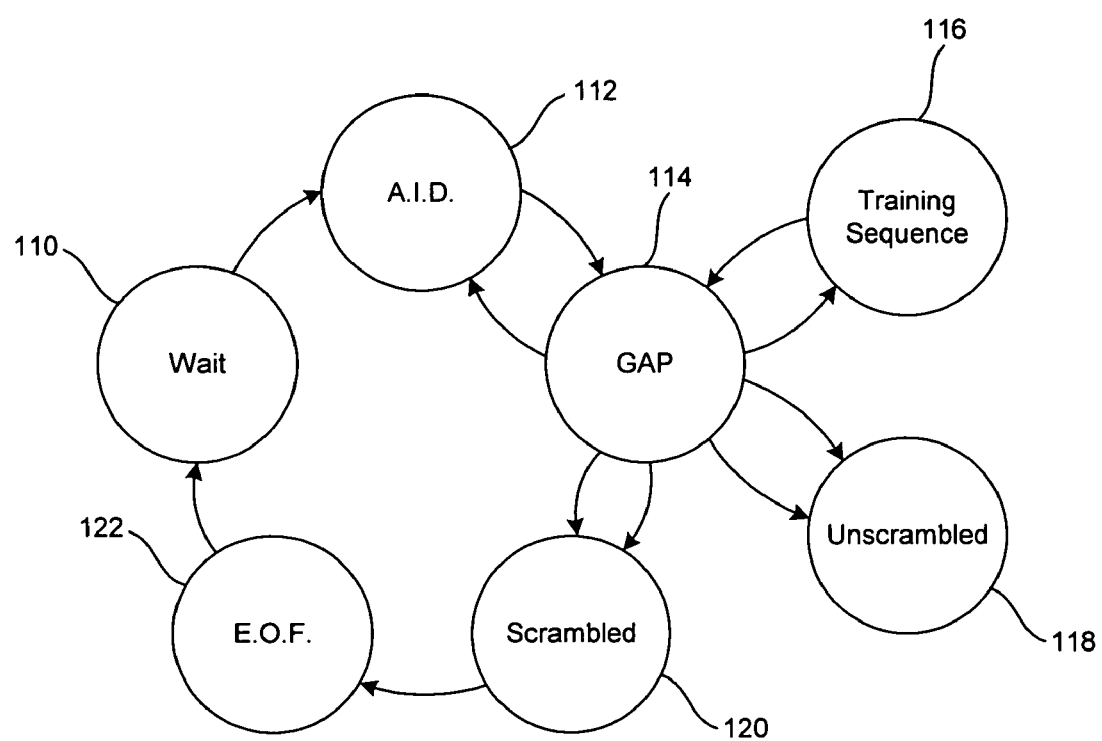
FIG. 4 is a state machine diagram of operation of a frame schedule circuit in accordance with one embodiment of this invention.

Referring to FIG. 4, in conjunction with FIG. 3, a state machine diagram of the operation of the frame schedule circuit 56 is shown. In the wait state 110, the schedule circuit 56 is merely waiting for the media access controller 42 to assert a transmit enable signal on line 54 indicating that data is to be transmitted. Upon receipt of such signal from the media access controller 42, the frame schedule circuit 56 transitions to an AID state 112. In the AID state 112, the frame schedule circuit 56 is operating to request AID pulse positions from the AID pulse generator circuit 104 and generate pulse position data on line 106 for the mapper 60. After each pulse, the frame schedule circuit 56 transitions to gap state 114. In the gap state 114, the frame schedule circuit 56 is providing a gap enable circuit on line 108 for insertion of blanking gap data by the blanking interval inserter 62.

After completion of transmitting the AID portion of the frame, the frame schedule circuit transitions to the training sequence state 116. In the training sequence state 116, the frame schedule circuit 56 is controlling: i) the select signal on line 95 to provide for the second multiplexer 92 to select data from the register 94; ii) the enable pre-amble signal to enable the register to clock out the training sequence data at the appropriate bit rate; and iii) the mapper enable signal on line 102 to enable the mapper to begin encoding the data output from the second multiplexer 92. The frame schedule circuit 56 transitions back and forth between the training sequence state 116 and the gap state 114 for each timing window 22 (FIG. 2(b).

Once the training sequence is complete, the schedule circuit 56 transitions to an unscrambled state 118. In the unscrambled state 118, the schedule circuit 56 continues to provide the mapper enable signal on line 102, however, the select signal on line 95 is switched to provide for the second multiplexer 92 to select data on line 90 and the select signal on line 88 is controlled to provide for the multiplexer 68 to select unscrambled data on line 82. Again, the frame schedule circuit 56 transitions back and forth between the unscrambled state 118 and the gap state 114 for each timing window 22 (FIG. 2(b).

After detecting the bit sequence for enabling the scrambler, the frame schedule circuit 56 transitions to the scrambled state 120. In the scrambled state 120, the frame schedule circuit 56 continues to; i) provide the mapper enable signal on line 102; and ii) provide the select signal on line 95 to control the second multiplexer 92 to select data on line 90. However, the select signal on line 88 is switched to provide for the multiplexer 68 to select scrambled data on line 86. Yet again, the frame schedule circuit 56 transitions back and forth between the scrambled state 120 and the gap state 114 for each timing window 22 (FIG. 2(b).

After transmitting the data supplied by the media access controller 42, the frame schedule circuit 55 transitions to the end of frame state 122. In the end of frame state 122 and similar to the training state 116, the frame schedule circuit 56 is controlling: i) the select signal on line 95 to provide for the second multiplexer 92 to select data from the register 94; ii) the enable pre-amble signal on line to enable the register to clock out the end of frame sequence at the appropriate bit rate; and iii) the mapper enable signal on line 102 to enable the mapper to continue encoding the data output from the second multiplexer 92.

After the transmitter 20 has completed transmitting the entire frame, including the end of frame sequence, the frame schedule circuit 56 transitions back to the wait state 110 where it again waits for the media access controller 42 to assert the transmit enable signal on line 54.

It should be appreciated that the above described device and methods provide for a simplified transmitter logic circuit for performing compatibility mode frame generation functions in a packet switched multiple access network environment.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A network transmitter generating data frames of data for transmission on a network medium, the transmitter including a frame generation circuit comprising:
    a) a first physical layer circuit generating data frames including overhead bits and data bits and modulating such frames of data for transmission on a network medium using a first modulation scheme;
    b) a second physical layer circuit generating data frames including overhead bits and data bits received from the media access layer circuit and modulating such frames of data for transmission on a network medium using a second modulation scheme; and
    c) the first physical layer circuit and the second physical layer circuit being operatively coupled for generating a compatibility mode frame, by the second physical layer circuit, comprising the initial header overhead bits modulated using the first modulation scheme and the remainder of the frame modulated using the second modulation scheme; wherein:
    the first modulation scheme is a pulse position modulation scheme and the second physical layer circuit obtains pulse position data from the first physical layer circuit for the initial header overhead bits, and
    the second modulation scheme is a quadrature amplitude modulation scheme and the second physical layer circuit generates pulses of a quadrature amplitude modulated carrier at times corresponding to the pulse position data to generate the initial header overhead bits.

2. The network transmitter of claim 1, where the pulse position modulation scheme encodes two bits of data in each pulse by generating each pulse at a position corresponding to one of four possible pulse positions following a predetermined time gap.

3. The network transmitter of claim 1, wherein the remainder of the frame utilizing the quadrature amplitude modulation comprises a sequence of gaps interspacing quadrature amplitude modulated data, the sequence of gaps being at the predetermined pulse position modulation time gaps.

4. The network transmitter of claim 1, further including a media access controller receiving a data file for transmission from an upper layer application and making data available to the second physical layer circuit on a data bus.

5. The network transmitter of claim 1, further including a scrambler for converting at least a portion of the remainder of the frame modulated using quadrature amplitude modulation scheme to a scrambled format prior to modulation, the scrambled format providing for adequate bit transitions to limit electromagnetic noise outside a predefined transmission band.

6. The network transmitter of claim 1, wherein the initial header overhead bits comprises 16 bits and the remainder of the frame comprises additional overhead bits including 48 preamble bits which are quadrature amplitude modulated in an unscrambled format.

7. The network transmitter of claim 5, wherein a predetermined bit sequence from the media access layer initializes the scrambler, the predetermined bit sequence occurring after the preamble and before a data portion of the frame.

8. A method of transmitting data frames in a frame switched network including a first device capable of transmitting and receiving data frames utilizing pulse position modulation a plurality of second devices capable of transmitting and receiving data frames utilizing quadrature amplitude modulation, the method comprising:
    a) transmitting initial header overhead bits complying with the pulse position modulation scheme by transmitting pulses of a quadrature amplitude modulated carrier, utilizing a quadrature amplitude modulation physical layer circuit, in time durations complying with valid pulse positions;
    b) transmitting the remainder of the frame utilizing the quadrature amplitude modulation scheme; and
    c) scrambling at least a portion of the remainder of the frame modulated using quadrature amplitude modulation scheme to a scrambled format prior to modulation, the scrambled format providing for adequate bit transitions to limit electromagnetic noise outside a predefined transmission band;
    wherein a predetermined bit sequence from a media access layer initializes the scrambling, the predetermined bit sequence occurring after a preamble and before a data portion of the frame.

9. The method of claim 8, wherein the positions of the pulses is determined by a pulse position modulation physical layer circuit operatively coupled to the quadrature amplitude modulation physical layer circuit.

10. The method of claim 8, wherein the pulse position modulation scheme encodes two bits of data in each pulse by generating each pulse at a position corresponding to one of four possible pulse positions following a predetermined time gap.

11. The method of claim 8, wherein the remainder of the frame utilizing the quadrature amplitude modulation comprises a sequence of gaps interspacing quadrature amplitude modulated data, the sequence of gaps being at the predetermined pulse position modulation time gaps.

12. The method of claim 8, further including a step of receiving the frame from a media access controller which in turn receives a data file for transmission from an upper layer application.

13. The method of claim 8, wherein the initial header overhead bits comprises 16 bits and the remainder of the frame comprises additional overhead bits including 48 preamble bits which are quadrature amplitude modulated in an unscrambled format.

* * * * *